United States Patent
Veilleux, Jr. et al.

(10) Patent No.: US 10,746,042 B2
(45) Date of Patent: Aug. 18, 2020

(54) SYSTEMS AND METHODS FOR ACTIVE CLEARANCE CONTROL BASED ON SELECTED OPERATING MODE

(71) Applicant: UNITED TECHNOLOGIES CORPORATION, Farmington, CT (US)

(72) Inventors: Leo J. Veilleux, Jr., Wethersfield, CT (US); Thomas O. Harris, Windsor, CT (US); Lubomir A. Ribarov, West Hartford, CT (US)

(73) Assignee: RAYTHEON TECHNOLOGYIES CORPORATION, Farmington, CT (US)

( * ) Notice: Subject to any disclaimer, the term of this patent is extended or adjusted under 35 U.S.C. 154(b) by 195 days.

(21) Appl. No.: 15/933,668

(22) Filed: Mar. 23, 2018

(65) Prior Publication Data

US 2019/0292932 A1   Sep. 26, 2019

(51) Int. Cl.
*F01D 11/22* (2006.01)
*B64D 31/00* (2006.01)
*F01D 15/02* (2006.01)
*F02C 7/28* (2006.01)
(Continued)

(52) U.S. Cl.
CPC ............. *F01D 11/22* (2013.01); *B64D 31/00* (2013.01); *F01D 15/02* (2013.01); *F01D 25/246* (2013.01); *F02C 7/28* (2013.01); *G05B 19/04* (2013.01); *F05D 2240/11* (2013.01); *F05D 2260/96* (2013.01); *F05D 2270/07* (2013.01); *F05D 2270/11* (2013.01); *F05D 2270/20* (2013.01);
(Continued)

(58) Field of Classification Search
CPC ........ F01D 11/22; F01D 25/246; F01D 15/02; G05B 19/04; G05B 2219/2623; F02C 7/28; B64D 31/00; F05D 2240/11; F05D 2270/66; F05D 2270/20; F05D 2270/11; F05D 2270/07; F05D 2260/96
See application file for complete search history.

(56) References Cited

U.S. PATENT DOCUMENTS

| 5,545,007 A | 8/1996 | Martin |
| 7,455,495 B2 | 11/2008 | Leogrande et al. |
| 8,126,628 B2 | 2/2012 | Hershey et al. |

(Continued)

FOREIGN PATENT DOCUMENTS

| GB | 2104966 | 3/1983 | |
| GB | 2104966 A | * 3/1983 | .............. F01D 11/24 |

OTHER PUBLICATIONS

Eueopean Patent Office, European Search Report dated Jul. 23, 2019 in Application No. 19164034.1.

*Primary Examiner* — Eldon T Brockman
(74) *Attorney, Agent, or Firm* — Snell & Wilmer, L.L.P.

(57) ABSTRACT

An objective-driven system for blade tip clearance control may comprise a BOAS and a controller in operable communication with the BOAS. A tangible, non-transitory memory may be configured to communicate with the controller, the tangible, non-transitory memory may have instructions stored thereon that, in response to execution by the controller, cause the controller to perform operations comprising receiving an operating objective definition, and modulating a location of the BOAS using an optimization loop comprising the operating objective definition, input vector variables, and output vector variables driven by the input vector variables.

20 Claims, 7 Drawing Sheets

(51) Int. Cl.
    *F01D 25/24*        (2006.01)
    *G05B 19/04*        (2006.01)
(52) U.S. Cl.
    CPC .. *F05D 2270/66* (2013.01); *G05B 2219/2623* (2013.01)

(56) References Cited

U.S. PATENT DOCUMENTS

| | | | |
|---|---|---|---|
| 8,296,037 B2 | 10/2012 | Plunkett et al. | |
| 9,028,205 B2* | 5/2015 | Harris | F02C 9/16 415/173.1 |
| 9,145,202 B2 | 9/2015 | Mathews, Jr. et al. | |
| 9,758,252 B2 | 9/2017 | Adibhatla et al. | |
| 2003/0215323 A1 | 11/2003 | Prinz | |
| 2013/0336758 A1* | 12/2013 | Harris | F02C 9/16 415/1 |
| 2015/0159500 A1 | 6/2015 | Carlucci et al. | |
| 2016/0311546 A1 | 10/2016 | Adibhatla | |
| 2017/0130602 A1 | 5/2017 | Schelfaut | |

* cited by examiner

US 10,746,042 B2

SYSTEMS AND METHODS FOR ACTIVE CLEARANCE CONTROL BASED ON SELECTED OPERATING MODE

FIELD

The present disclosure relates generally to gas turbine engines, and more specifically, to systems and methods for objective-driven blade tip clearance control.

BACKGROUND

Gas turbine engines typically comprise a compressor module, a combustor module, and a turbine module, along with subsystems and accessories to control cooling, air bleed, variable geometry, etc. The efficiency of the turbine section may be affected by tip clearance between a blade tip and a blade outer air seal (BOAS). The BOAS is typically coupled to a case of the gas turbine engine. Current tip clearance systems tend to minimize tip clearances to enhance engine performance.

SUMMARY

An objective-driven system of blade tip clearance control for a gas turbine engine is disclosed herein according to various embodiments. The system may comprise a blade and a blade outer air seal disposed radially outward of the blade. A controller may be in operable communication with the blade outer air seal. A tangible, non-transitory memory may be configured to communicate with the controller. The tangible, non-transitory memory may have instructions stored thereon that, in response to execution by the controller, cause the controller to perform operations comprising: receiving an operating objective definition, and modulating a distance between the blade and the blade outer air seal based on the operating objective definition.

In various embodiments, the operations may further comprise modulating an engine climb thrust rating based on the operating objective definition. In various embodiments, the operating objective definition may be at least one of: a high-performance mode comprising a first distance between the blade and the blade outer air seal and a first engine climb thrust rating; a fuel-efficiency mode comprising a second distance between the blade and the blade outer air seal and a second engine climb thrust rating, wherein the second distance is less than or equal to the first distance, and wherein the second engine climb thrust rating is less than the first engine climb thrust rating; and a life-cycle cost-minimization mode comprising a third distance between the blade and the blade outer air seal and a third engine climb thrust rating, wherein the third distance is less than or equal to the second distance, and wherein the third engine climb thrust rating is less than or equal to the second engine climb thrust rating.

In various embodiments, the operating objective definition may be at least one of: a high-performance mode comprising a first distance between the blade and the blade outer air seal and a first engine climb thrust rating; a fuel-efficiency mode comprising a second distance between the blade and the blade outer air seal and a second engine climb thrust rating, wherein the second distance is less than or equal to the first distance, and wherein the second engine climb thrust rating is less than the first engine climb thrust rating; and a noise reduction mode comprising a third distance between the blade and the blade outer air seal and a third engine climb thrust rating, wherein the third distance is less than or equal to the second distance, and wherein the third engine climb thrust rating is less than or equal to the second engine climb thrust rating.

In various embodiments, the operations may further comprise determining an optimal distance between the blade and the blade outer air seal and an optimal engine climb thrust rating using an optimization loop comprising the operating objective definition, a plurality of input vector variables, and a plurality of output vector variables. In various embodiments, the plurality of input vector variables may be updated in real-time.

In various embodiments, the controller may be configured to recognize an override signal output from a cockpit. Upon receiving the override signal, the controller may adjust at least one of the distance between the blade and the blade outer air seal or the engine climb thrust rating based on the override signal.

In various embodiments, the operations may further comprise modulating an aircraft parameter based on the operating objective definition. In various embodiments, modulating the distance between the blade and the blade outer air seal may comprise receiving a position signal from a blade outer air seal position sensor, receiving a temperature signal from an exhaust gas temperature sensor, and outputting a command signal to an actuator in operable communication with the blade outer air seal.

A method of objective-driven blade tip clearance control for a gas turbine engine is also disclosed herein. According to various embodiments, the method may comprise inputting, into a controller, an operating objective definition, and determining, by the controller, an optimal distance between a blade of the gas turbine engine and a blade outer air seal disposed radially outward of the blade using an optimization loop comprising the operating objective definition, a plurality of input vector variables, and a plurality of output vector variables driven by the plurality of input vector variables. The method may further comprise determining, by the controller, an optimal engine climb thrust rating using the optimization loop, modulating, by the controller, a distance between the blade and the blade outer air seal based on the optimal distance, and modulating, by the controller, an engine climb thrust rating based on the optimal engine climb thrust rating.

In various embodiments, the method may further comprise determining, by the controller, an optimal aircraft parameter using the optimization loop, and modulating, by the controller, an aircraft parameter based on the optimal aircraft parameter.

In various embodiments, the operating objective definition may be at least one of: a high-performance mode comprising a first distance between the blade and the blade outer air seal and a first engine climb thrust rating, a fuel-efficiency mode comprising a second distance between the blade and the blade outer air seal and a second engine climb thrust rating, wherein the second distance is less than or equal to the first distance, and wherein the second engine climb thrust rating is less than the first engine climb thrust rating, and a life-cycle cost-minimization mode comprising a third distance between the blade and the blade outer air seal and a third engine climb thrust rating, wherein the third distance is less than or equal to the second distance, and wherein the third engine climb thrust rating is less than or equal to the second engine climb thrust rating.

In various embodiments, the method may further comprise configuring the operating objective definition to increase an exhaust gas temperature margin. In various embodiments, the method may further comprise configuring the controller to recognize an override of the operating objective definition. In various embodiments, the plurality of input vector variables may be updated in real-time.

In various embodiments, modulating the distance between the blade and the blade outer air seal based on the optimal distance may comprise receiving, by the controller, a position signal from a blade outer air seal position sensor, comparing, by the controller, the position signal to the optimal distance, and outputting, by the controller, a command signal to an actuator in operable communication with the blade outer air seal.

An objective-driven system for blade tip clearance control is also disclosed herein. According to various embodiments, the system may comprise a blade outer air seal and a controller in operable communication with the blade outer air seal. A tangible, non-transitory memory may be configured to communicate with the controller. The tangible, non-transitory memory may have instructions stored thereon that, in response to execution by the controller, cause the controller to perform operations comprising receiving an operating objective definition, and modulating a location of the blade outer air seal using an optimization loop comprising the operating objective definition, a plurality of input vector variables, and a plurality of output vector variables driven by the plurality of input vector variables.

In various embodiments, modulating the location of the blade outer air seal may comprise determining an optimal distance between the blade outer air seal and a blade radially inward of the blade outer air seal using the optimization loop, receiving a position signal from a blade outer air seal position sensor, comparing the position signal to the optimal distance, and outputting a command signal to an actuator in operable communication with the blade outer air seal.

In various embodiments, the operations may further comprise modulating an engine climb thrust rating using the optimization loop. In various embodiments, the operations may further comprise modulating an aircraft parameter using the optimization loop.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found In re Nuijten to fall outside the scope of patentable subject matter under 35 U.S.C. § 101.

Figure 1:
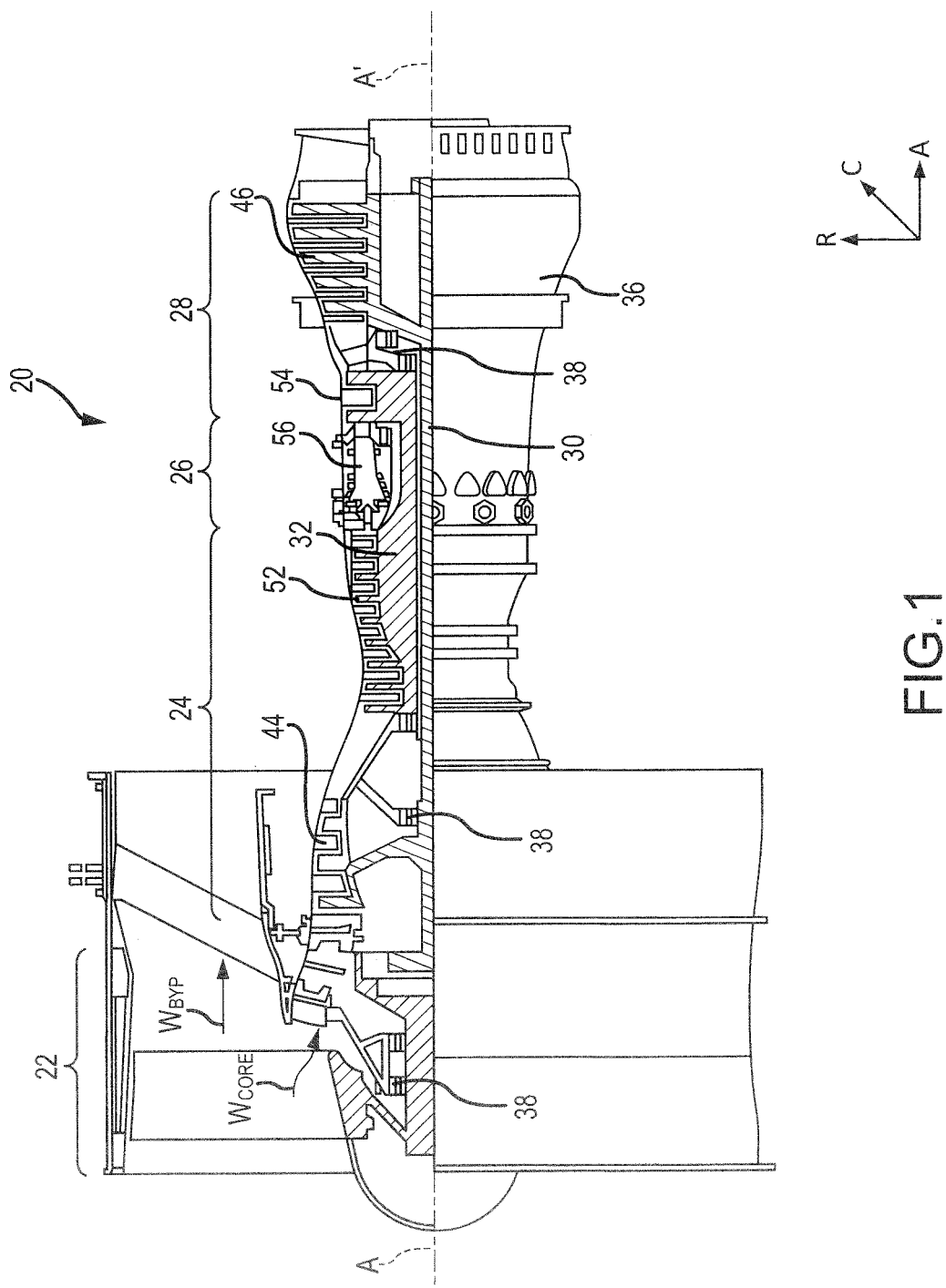
FIG. 1 illustrates a gas turbine engine, in accordance with various embodiments.

With reference to FIG. 1, a gas turbine engine 20 is shown according to various embodiments. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. A-R-C axes have been included in the drawings to illustrate the axial (A), radial (R) and circumferential (C) directions.

Gas turbine engine 20 is an example of a two-spool turbofan that generally incorporates a fan section 22, a compressor section 24, a combustor section 26, and a turbine section 28. Alternative engines may include, for example, an augmentor section-among other systems or features. In operation, fan section 22 can drive fluid (e.g., air) along a path of bypass airflow $W_{BYP}$, while compressor section 24 can drive fluid along a core flowpath $W_{CORE}$ for compression and communication into combustor section 26 and then expansion through turbine section 28. Although gas turbine engine 20 is depicted as a two-spool turbofan herein, it should be understood that the concepts described herein are not limited to use with turbofans as the teachings may be applied to other types of turbine engines including multi-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38. Engine central longitudinal axis A-A' is oriented in the A-direction on the provided A-R-C axes. It should be understood that various bearing systems 38 at various locations may alternatively or additionally be provided.

The core airflow $W_{CORE}$ may be compressed by a low pressure compressor 44 then a high pressure compressor 52, mixed and burned with fuel in combustor 56, then expanded over a high pressure turbine 54 and a low pressure turbine 46. Turbines 46, 54 rotationally drive, respectively, low speed spool 30 and high speed spool 32 in response to the expansion. Low pressure compressor 44, high pressure compressor 52, low pressure turbine 46, and high pressure turbine 54 may comprise one or more stages or sets of rotating blades and one or more stages or sets of stationary (i.e., non-rotating) vanes axially interspersed with the associated blade stages.

Figure 2:
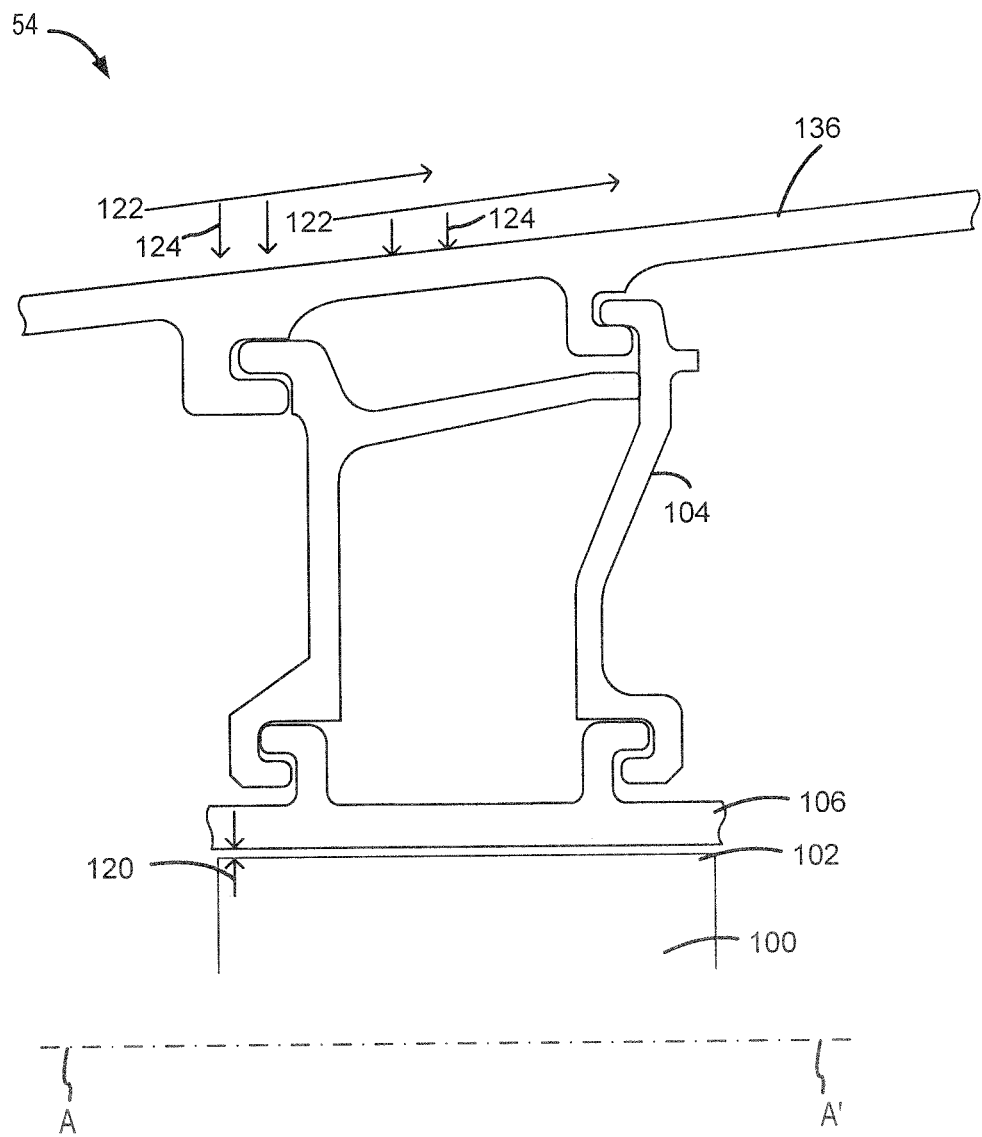
FIG. 2 illustrates a schematic cross-section of a portion of a high pressure turbine section of the gas turbine engine of FIG. 1, in accordance with various embodiments.

With reference to FIG. 2, a cross-sectional view of a portion of high pressure turbine 54 is illustrated, in accordance with various embodiments. High pressure turbine 54 may include a first rotating member or blade 100. Blade 100 may be configured to rotate about engine central longitudinal axis A-A', in response to receiving a flow of fluid (e.g., a burned air/fuel mixture) from combustor section 26 (FIG. 1). Power from the flow may be converted to mechanical power, or torque, by blade 100.

An annular blade outer air seal (BOAS) 106 may be located radially outward from blade 100. BOAS 106 may be a static structure (i.e., a structure that does not rotate about engine central longitudinal axis A-A') designed to reduce air leakage over the radially outward portion, or "blade tip," 102 of blade 100. A BOAS support 104 may be coupled between BOAS 106 and a case 136. In that regard, BOAS 106 may be coupled to case 136 via BOAS support 104. In various embodiments, case 136 may form a portion of engine casing structure 36 in FIG. 1. A blade tip-to BOAS distance 120 (also referred to as a tip clearance) is located between blade tip 102 of blade 100 and BOAS 106.

In various embodiments, an air flow 122 (e.g., from bypass flow $W_{BYP}$) along a radially outward portion of case 136 may be employed to adjust blade tip-to BOAS distance 120. For example, a flow rate of air flow 122 may be increased to increase a load 124 applied, by air flow 122, to case 136 in a radially inward direction. The load applied to case 136 may force BOAS support 104 and BOAS 106 radially inward towards blade tip 102, thereby reducing blade tip-to BOAS distance 120. A flow rate of air flow 122 may be decreased to decrease the load 124 applied, by air flow 122, and thereby cause BOAS support 104 and BOAS 106 to translate radially outward away from blade tip 102 and increase blade tip-to BOAS distance 120. In various embodiments, an actuator may be in operable communication with BOAS 106 and may be configured to, upon instruction from a controller, translate BOAS 106 towards and away from blade tip 102.

Figure 3A:
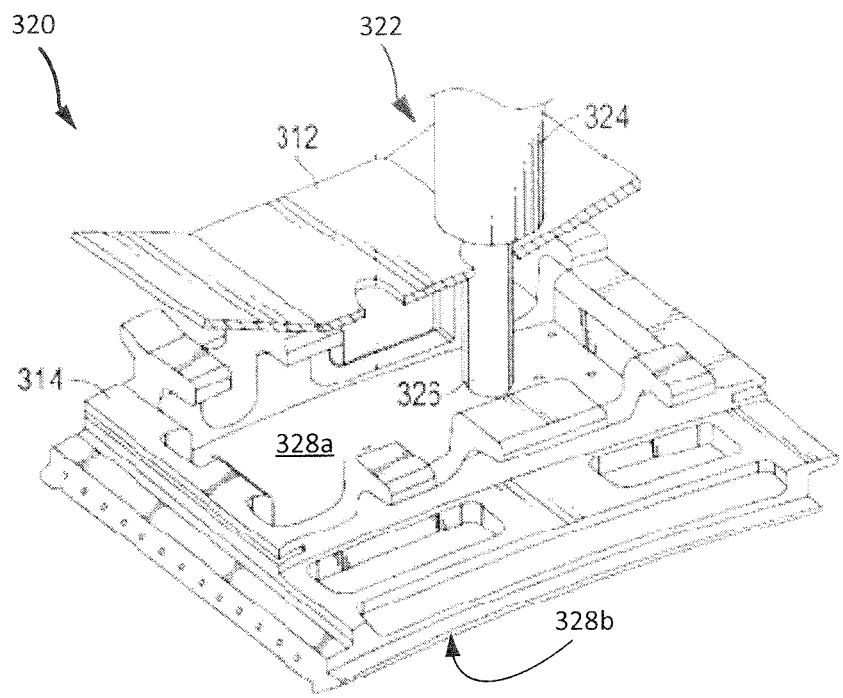
FIGS. 3A and 3B illustrate, respectively, a perspective view and a cross-section view of a blade tip clearance system having an actuator, in accordance with various embodiments.
Figure 3B:
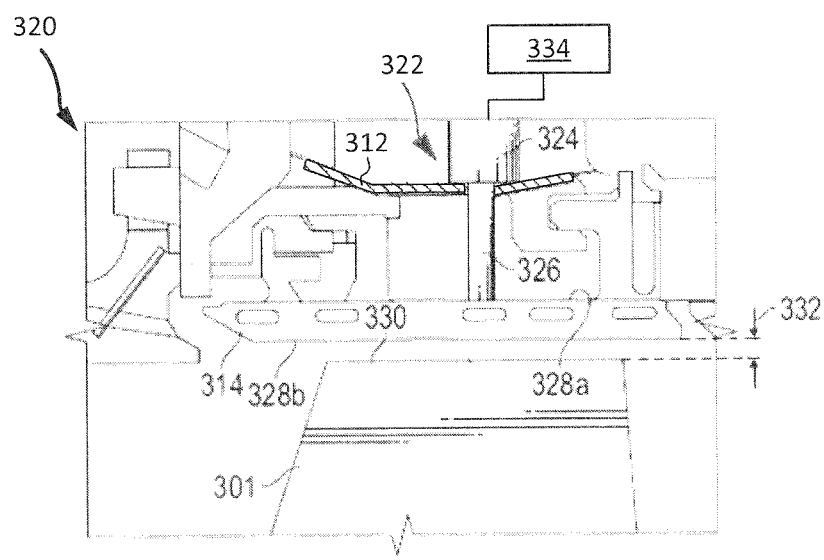

With reference to FIGS. 3A and 3B, a perspective view and a cross-section view, respectively, of a blade tip clearance system 320 are illustrated, according to various embodiments. In various embodiments, blade tip clearance system 320 may be included in high pressure turbine 54 and/or low pressure turbine 46 of gas turbine engine 20 in FIG. 1. Blade tip clearance system 320 includes a BAOS actuator 322. BOAS actuator 322 may comprise an anchor portion 324 for fixation to an interior surface of a case or housing 312 and an actuating portion 326 for actuating movement relative to the anchor portion 324. Housing 312 may form, or be coupled to, a portion of engine casing structure 36 in FIG. 1. Blade tip clearance system 320 may be operably connected a BOAS 314. Actuating portion 326 of BOAS actuator 322 may be operably coupled to an outer diameter surface 328a of BOAS 314. Actuating portion 326 of BOAS actuator 322 may be configured to move relative to housing 312 to adjust a blade tip-to BOAS distance 332 between an inner diameter surface 328b of BOAS 314 and a blade tip 330 of blade 301. Blade tip clearance system 320 may be configured to, upon instruction from a controller 334, adjust blade tip-to BOAS distance 332. BOAS actuator 322 of blade tip clearance system 320 may be controlled by controller 334. Controller 334 may be a mechanical system, electromechanical system, or electrical circuit attached to BOAS actuator 322. In various embodiments, BOAS actuator 322 may be hard wired or controlled wirelessly by controller 334.

Thrust specific fuel consumption (TSFC) has been employed as a metric in engine performance optimization. Tip clearance control systems have generally been configured to optimize TSFC by reducing or minimizing blade tip clearances. In addition, reducing or minimizing blade tip clearances may decrease an exhaust gas temperature (EGT), which tends to increase engine life and reduce engine noise. Accordingly, a tip clearance control system that considers input variables in addition to TSFC (e.g., local aircraft fuel price, local maintenance and repair costs, engine life (i.e., time-on-wing (TOW)), take-off and climb de-rating, gross take-off weight, mission range, ambient weather conditions, etc.) may be desirable.

Figure 4:
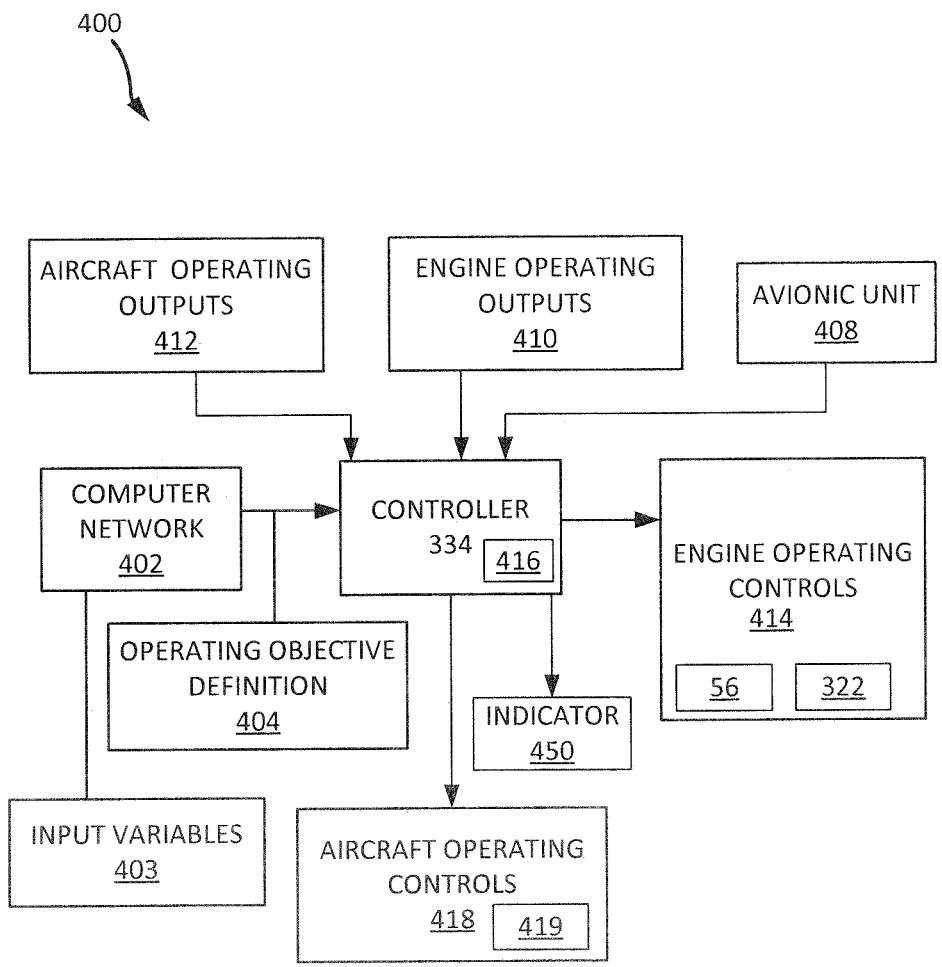
FIG. 4 illustrates a schematic diagram of an objective-driven system of blade tip clearance control, in accordance with various embodiments.

With reference to FIG. 4, a schematic diagram of an objective-driven system 400 for blade tip clearance control is illustrated, according to various embodiments. Objective-driven system 400 may allow an airline operator (or a pilot) to select from various predefined operational modes depending on the airline operator's desired objective(s). In various embodiments, the operational modes (also referred to as operating objective definitions) from which the operator may choose include: a high-performance mode, a fuel-efficiency mode, and a life cycle cost-minimization mode.

Objective-driven system 400 may allow an airline operator (or a pilot) to select an operating objective definition for an aircraft engine that coincides with the operator's current and/or long-term operating goals. For example, an operator may select high-performance mode if the aircraft is running behind schedule (e.g., late take-off, or strong unfavorable head or cross winds), or the operator may select fuel efficiency mode if the aircraft is ahead of schedule (or if there are strong favorable tail winds), or the operator may select life cycle cost-minimization mode if the operator has a greater interest in decreased maintenance and/or engine repair/replacement costs, as compared to fuel efficiency or engine climb thrust rating. Objective-driven system 400 may also allow an operator to set the operational mode such that the engine operates in manner consistent with the operator's, rather than the pilot's, desired objectives. For example, a selection of aircraft life cycle cost-minimization mode by the operator may prevent or decrease occurrences of a pilot pushing an engine into high-performance mode unnecessarily.

In various embodiments, high-performance mode may comprise a first blade tip-to-BOAS distance (i.e., distance 332 in FIG. 3B) and an increased or maximum engine climb thrust rating (i.e., a reduced engine climb thrust de-rating). For example, an engine climb thrust rating in high-performance mode may be between 95% and 100% of the engine's certification limit. In various embodiments, the engine climb thrust rating in high-performance mode may be between 98% and 100% of the engine's certification limit.

Fuel-efficiency mode may comprise a second blade tip-to-BOAS distance and a de-rated engine climb thrust rating. For example, the blade tip-to-BOAS distance in fuel-efficiency mode may be less than or equal to the blade tip-to-BOAS distance in high performance mode, and the engine climb thrust rating in fuel-efficiency mode may be less than the engine climb thrust rating in high-performance mode. In various embodiments, the engine climb thrust rating in fuel-efficiency mode may be between 85% and 95% of the engine's certification limit. In various embodiments, the engine climb thrust rating in fuel-efficiency mode may be between 90% and 95% of the engine's certification limit.

Life cycle cost-minimization mode may comprise a third blade tip-to-BOAS distance and a de-rated engine climb thrust rating. For example, the blade tip-to-BOAS distance in life cycle cost-minimization mode may be less than or equal to the blade tip-to-BOAS distance in fuel-efficiency and high performance modes, and the engine climb thrust rating in life cycle cost-minimization may be less than or equal to the engine climb thrust rating in fuel-efficiency mode and high-performance mode. In various embodiments, the engine climb thrust rating in life cycle cost-minimization mode may be between 75% and 90% of the engine's certification limit. In various embodiments, the engine climb thrust rating in life cycle cost-minimization mode may be between 85% and 90% of the engine's certification limit. In various embodiments, operating in life cycle cost-minimization mode may increase an EGT margin (i.e. a difference between an engine's current EGT and a predetermined EGT threshold).

In various embodiments, life cycle cost-minimization mode may also be employed as a noise-reduction mode. In this regard, a noise-reduction mode may comprise a blade tip-to-BOAS distance that is less than or equal to the blade tip-to-BOAS distance in fuel-efficiency and high performance mode, and a de-rated engine climb thrust rating. For example, the engine climb thrust rating in noise reduction mode may be less than or equal to the engine climb thrust rating in fuel-efficiency mode and high-performance mode. In various embodiments, the engine climb thrust rating in noise reduction mode may be between 75% and 90% of the engine's certification limit. In various embodiments, the engine climb thrust rating in noise reduction mode may be between 85% and 90% of the engine's certification limit. In various embodiments, noise reduction mode be employed at or near airports in urban area or in areas where a reduced noise footprint may be desirable. In other words, a selection of noise-reduction mode may cause the climb thrust rating to be decreased, which reduces engine speed and lowers the engine noise (e.g., to match airframe noise), thus providing more environmental noise-friendly flight operations.

Objective-driven system 400 may include controller 334. In various embodiments, controller 334 may comprise a full authority digital engine control (FADEC) system. In various embodiments, portions of objective-driven system 400 may be located off-board. In this regard, controller 334 may be located externally from an aircraft, in any suitable computer-based system. Controller 334 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Controller 334 may receive data corresponding to input vectoriables 403 and an operating objective definition 404. The input vector variables 403 and operating objective definition 404 may be communicated to an aircraft's on-board computer network 402, which in turn, can communicate with controller 334 through a dedicated data bus. Controller 334 may include a memory 416. Memory 416 may store executable instructions and data to implement control logic of controller 334. Memory 416 may comprise a tangible, non-transitory storage medium and may store data used, for example, for trending and prognosis purposes.

Controller 334 may receive and interpret data correlating to various engine and aircraft operating conditions, such as an altitude of the aircraft, an ambient temperature, a speed of the aircraft, Mach number, location information, a rotational speed of the low and/or high speed spool, blade tip clearance, engine climb thrust rating, surface flap positions, or any other operating information. Controller 334 may also receive objective modification variable data, such as fuel price at take-off location, fuel price at landing location, maintenance prices, EGT margins, etc.

Controller 334 may receive data from one or more avionics units 408. For example, controller 334 may receive altitude, ambient pressure, aircraft speed, etc. data from avionics unit 408. Controller 334 may receive data from one or more engine operating parameter outputs 410. For example, engine operating parameter outputs 410 may comprise blade tip clearance sensors, fan rotational speed sensors, exhaust temperature sensors, or other components, which output data related to the operating condition of gas turbine engine 20 to controller 334. Controller 334 may receive data from one or more aircraft operating parameter outputs 412. For example, controller 334 may receive surface flap position, power consumption, landing gear position, or other aircraft operating component data from aircraft operating parameter outputs 412. Controller 334 may interpret data received from avionics unit 408, engine operating outputs 410, and/or aircraft operating output 412 along with input vector variables 403 to determine a blade tip-to BOAS distance and/or an engine climb thrust rating that is consistent with the operating objective definition 404.

With combined reference to FIG. 1 and FIG. 4, controller 334 may be configured to output signals, or commands, to one or more engine operating controls 414. Engine operating controls 414 may modulate one or more operating conditions/parameters of gas turbine engine 20. For example, controller 334 may output commands that cause translation of BOAS actuator 322. Controller 334 may output commands to components of combustor 56 to adjust a climb thrust rating of gas turbine engine 20 (e.g., to de-rate engine climb thrust). Controller 334 may be configured to output signals, or commands, to one or more aircraft operating controls 418. Aircraft operating controls 418 may modulate one or more operating conditions/parameters of the aircraft to which gas turbine engine 20 is attached. For example, controller 334 may output commands that cause translation of aircraft surface flaps 419.

In various embodiments, an indicator 450, for example a light or a display screen, may be in operable communication with controller 334. Indicator 450 may be configured to convey which mode the engine is currently operating (i.e., high-performance, fuel-efficiency, or life cycle cost-minimization). In various embodiments, indicator 450 may be located on a control panel in the cockpit of the aircraft.

Controller 334 may be configured to modulated blade tip-to BOAS distance and engine climb thrust rating based on the operating objective definition 404 selected by the aircraft operator. As discussed in further detail below, controller 334 may determine an optimal blade tip-to BOAS distance and an optimal engine climb thrust rating using an optimization loop that allows controller 334 to weigh the operating objective definition 404 against one or more input vector variables 403 and other engine and/or aircraft operating parameters.

Figure 5A:
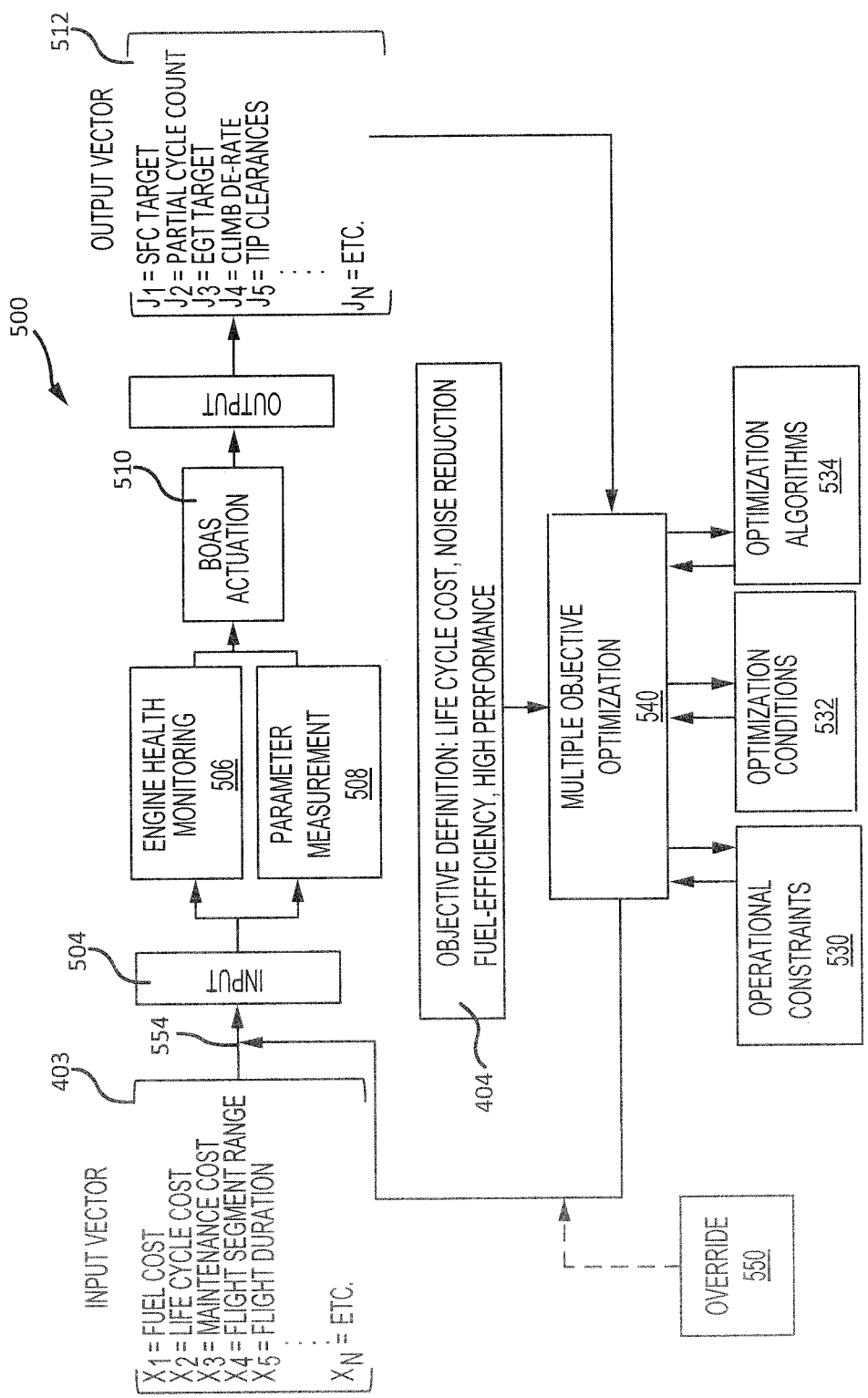
FIGS. 5A and 5B illustrate an optimization loop for an objective-driven system of blade tip clearance, in accordance with various embodiments.
Figure 5B:
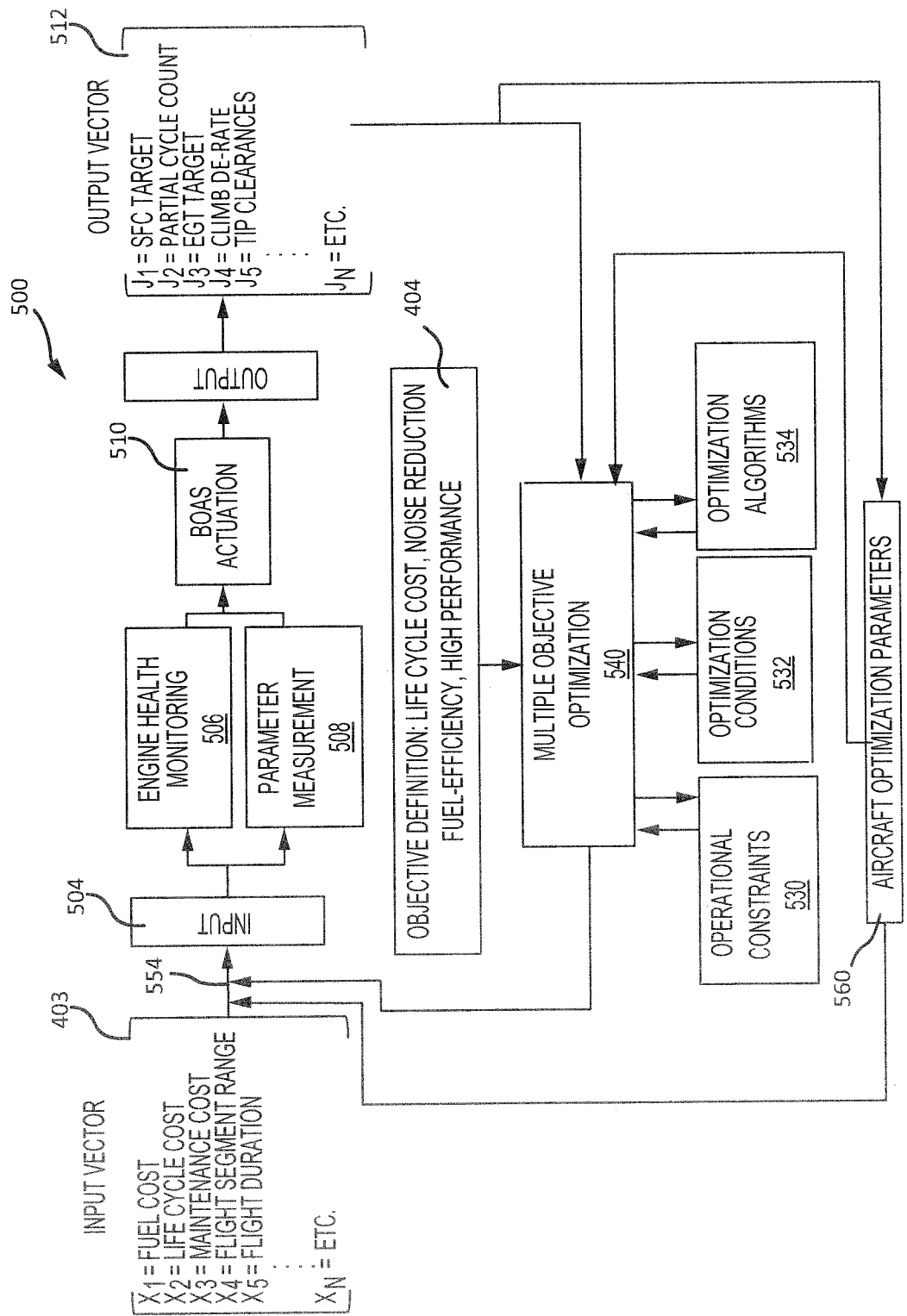

Referring to FIGS. 5A and 5B an optimization loop 500 which may be employed by controller 334 of objective-driven system 400 in FIG. 4 is illustrated, in accordance with various embodiments. As shown, the selected operating objective definition 404 may be optimized based on a series of input vector variables $(X_1, X_2, \ldots, X_N)$ 403 driving a series of output vector variables $(J_1, J_2, \ldots, J_N)$ 512 in a closed loop solution.

With combined reference to FIGS. 1, 3B, and 5A, optimization loop 500 may be employed by controller 334 to modulate blade tip-to-BOAS distance 332 and a climb thrust rating of gas turbine engine 20 based on the preselected operating objective definition 404.

The input vector variables 403 (along with other data and variables of optimization loop 500) may be received and interpreted by controller 334 throughout engine operation. In this regard, controller 334 may manipulate blade tip-to-BOAS distance 332 and the climb thrust of gas turbine engine 20 throughout a flight cycle, in accordance with the operating objective definition 404. In various embodiments, the input vector variables 403 may be provided and/or updated in real-time.

Input vector variables 403 may comprise, but are not limited to, variable jet fuel prices (i.e., high vs. low prices), variable aircraft load factors (i.e., heavy vs. light load), variable aircraft utilization factors, variable ambient weather conditions (e.g., wind speed), variable airport air quality conditions (i.e., sandy/dusty/humid vs. cleaner/dry air), variable maintenance costs (i.e., expensive repair shop labor vs. cheaper repair shop labor), availability and costs of limited life parts (e.g., disks, seals, spools, shafts, etc.), variable engine compressor washing services (i.e., high-priced vs. low-priced).

Input vector variables 403 may be received at an input 504 of controller 334. Input vector variables 403 may be interpreted by controller 334, in conjunction with engine health monitoring data 506, and engine operating parameter data 508 (e.g., data output from engine operating outputs 410 in FIG. 4). Controller 334 may send BOAS actuation commands 510 based on input vector variables 403, engine health monitoring data 506, and engine operating parameter data 508.

Input vector variables 403, along with engine health monitoring data 506, engine operating parameter data 508, and BOAS actuation commands 510, may drive a plurality of output vector variables 512. Output vector variables 512 may comprise, but are not limited to, a specific fuel consumption target, partial cycle count, EGT target, de-rate of engine climb thrust, blade tip-to-BOAS distance, etc.

The controller 334 may employ the output vector variables 512, operating objective definition 404 (i.e., high-performance mode, fuel-efficiency mode, life-cycle cost minimization mode, noise reduction mode), operational constraints 530 (e.g., runway length, ambient air temperature, gross-aircraft weight, etc.), optimization conditions 532 (e.g., minimum engine climb thrust boundary, upper and lower altitude limits, etc.), and an optimization algorithm 534 to produce multiple objective optimization data 540. In various embodiments, optimization algorithm 534 may be configured to weigh an increase in climb time, which may result as the engine climb thrust is de-rated, against an increase in EGT margin, which may result as the EGT value is decreased (i.e., as blade tip-to BOAS distance is decreased).

Multiple objective optimization data 540 is combined with the input vector variables 403 at junction 554 and input into input 504 of controller 334, thereby creating a dynamic, closed optimization loop. Controller 334 may modulate the blade tip-to-BOAS distance or the engine climb thrust rating based on multiple objective optimization data 540. Stated differently, with momentary combined reference to FIGS. 4 and 5A, controller 334 may interpret multiple objective optimization data 540 to determine an optimum blade tip-to-BOAS distance and an optimum engine climb thrust rating, and then output commands to engine operating controls 414 based on the optimum blade tip-to-BOAS distance and the optimum engine climb thrust rating. In this regard, the dynamic, closed optimization loop allows controller 334 to employ real-time input vector variables 403 and real-time output vector variables 512 to update and optimize the blade tip-to-BOAS distance and the engine climb thrust rating throughout a flight cycle.

In various embodiments, at any point during operation, a human override (e.g., pilot input) can enter the optimization loop 500. For example, controller 334 may be configured to recognize an override signal 550, which nay be output from the cockpit. In this regard, should a pilot need to address an unexpected condition, for example, poor weather conditions or other danger, full engine climb thrust may be applied by the pilot.

With reference to FIGS. 3B and 5B, in various embodiments, one or more aircraft optimization parameters 560 may be included optimization loop 500. Aircraft optimization parameters 560 may comprise, but are not limited to, flight surface positions (e.g., wing flap(s) position), aircraft actuator positions, on-board electric power consumption, engine bleed air offtake data (e.g., environmental control system data, anti-ice system data, etc.), or other aircraft operating parameters. Aircraft optimization parameters 560 may be received (e.g., from aircraft operating outputs 412 in FIG. 4) and interpreted by controller 334. Aircraft optimization parameters 560 may be affected by output vector variables 512 and other data and variables in optimization loop 500. Aircraft optimization parameters 560 may be used by controller 334 to generate multiple objective optimization data 540. Aircraft optimization parameters 560 may also be combined with input vector variables 403 and provided to input 504. Controller 334 may modulate one or more aircraft parameters based on multiple objective optimization data 540. Stated differently, with momentary combined reference to FIGS. 4 and 5B, controller 334 may interpret multiple objective optimization data 540 to determine an optimum aircraft parameter. Controller 334 may then output commands to aircraft operating controls 414 based on the optimum aircraft parameter.

In various embodiments, in noise reduction mode, controller 334 may reduce a climb thrust of engine 20 from, for example, 0 feet to 10000 feet (0 m to 3048 m), such that an overall noise perception at or near the ground is lowered. Typical take-off speeds for modern airliners are around 130-155 knots (kts) (150-178 mph: 240-287 km/h). Various other factors contribute to setting a specific take-off speed (e.g., aircraft weight, wind speed/direction, available engine thrust, etc.). In various embodiments, these factors may be included as input vector variables 403. A reduction in take-off speed of, for example, 20-30 kts (23-35 mph; 37-56 km/h) can reduce the perceived noise at airports by, for example, 2-5 decibels.

In various embodiments, the reduced take-off speed, in noise reduction mode or in life-cycle cost minimization mode, may be compensated for by one or more flight control surfaces (e.g., wing flaps/slats/etc.). In this regard, controller 334 may actively adjust and optimize one or more flight control surfaces (i.e., aircraft optimization parameters 560) based on the objective optimization data 540 produced in response to an operating objective definition 404 of noise reduction mode or life-cycle cost minimization mode, and the input vectors variable 403 and output vector variable 512 related thereto.

Figure 6:
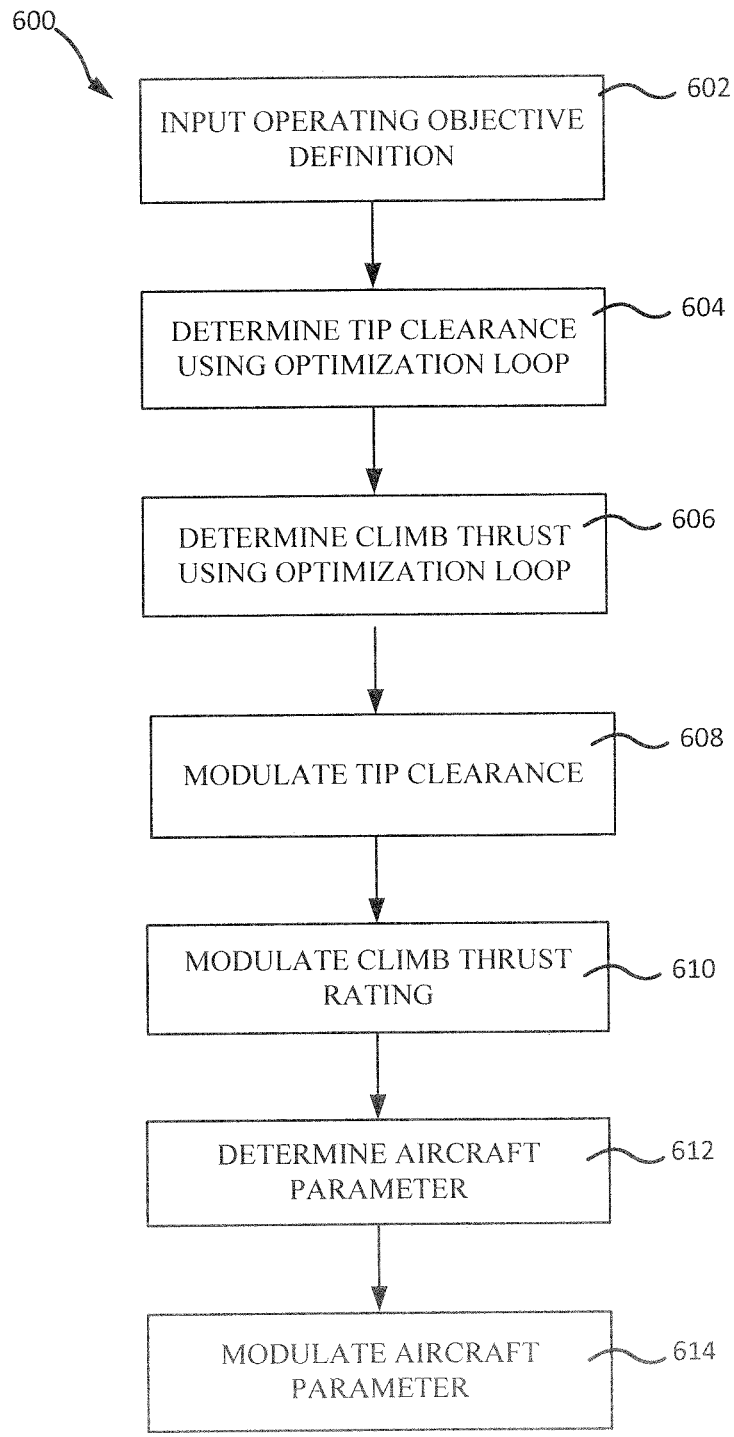
FIG. 6 illustrates a method of objective-driven blade tip clearance control, in accordance with various embodiments.

FIG. 6 illustrates a method 600 of objective-driven blade tip clearance control for a gas turbine engine, in accordance with various embodiments. Method 600 may comprise inputting an operating objective definition (step 602) and determining an optimal distance between a blade of the gas turbine engine and a blade outer air seal disposed radially outward of the blade using an optimization loop (step 604). The optimization loop may comprise the operating objective definition, a plurality of input vector variables, and a plurality of output vector variables driven by the plurality of input vector variables. Method 600 may further comprise determining an optimal engine climb thrust rating using the optimization loop (step 606). Method 600 may further comprise modulating a distance between the blade and the blade outer air seal based on the optimal distance (step 608), and modulating an engine climb thrust rating based on the optimal engine climb thrust rating (step 610).

In various embodiments, method 600 may further comprise determining an optimal aircraft parameter using the optimization loop (step 612), and modulating an aircraft parameter based on the optimal aircraft parameter (step 614).

With combined reference to FIG. 6, FIG. 4, and FIG. 5A, step 602 may comprise inputting an operating objective definition 404 into controller 334. Step 604 may comprise controller 334 determining an optimal distance between blade 301 and blade outer air seal 314 (with momentary reference to FIG. 3B) using optimization loop 500. Optimization loop 500 may comprise operating objective definition 404, a plurality of input vector variables 403, and a plurality of output vector variables 512 driven by the plurality of input vector variables 403. Step 606 may comprise controller 334 determining an optimal engine climb thrust rating using the optimization loop 500. Step 608 may comprise controller 334 modulating blade tip-to-BOAS distance 332 (with momentary reference to FIG. 3B) between blade 301 and blade outer air seal 314 based on the optimal distance determination in step 604. Stated differently, step 608 may comprise controller 334 receiving a position signal from an engine operating output 410 (e.g., from blade outer air seal position sensor), controller 334 comparing the position signal to the optimal distance determined in step 604, and controller outputting a command signal to an engine operating control 414 that is in operable communication with the blade outer air seal (e.g., to BOAS actuator 322) based on the comparison of the position signal to the optimal distance.

In various embodiments, step 610 may comprise controller 334 modulating an engine climb thrust rating based on the optimal engine climb thrust rating determination in step 606. Stated differently, controller 334 may send a command signal to one or more engine operating controls 414 that control engine climb thrust rating.

In various embodiments, step 612 may comprise controller 334 determining an optimal aircraft parameter using optimization loop 500. Step 614 may comprise controller 334 modulating an aircraft parameter (i.e., controller 334 sending a command signal to one or more aircraft operating controls 418) based on the optimal aircraft parameter determination in step 612.

Objective-driven system 400 (FIG. 4) and method 600 (FIG. 6) allow for active control of blade tip-to-BOAS distance and engine climb thrust rating for optimized engine operation in accordance with an operator's selected operating objective. Optimizing blade tip-to-BOAS distance and engine climb thrust rating tends to provide an efficient de-rating of engine power for climb with increased engine EGT margin. Increased EGT margin tends to increase engine life. Objective-driven system 400 and method 600 and may provide the capability to count "partial" engine cycles, and may reduce overall engine operating cost.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An objective-driven system of blade tip clearance control for a gas turbine engine, comprising:
    a blade;
    a blade outer air seal disposed radially outward of the blade;
    a controller in operable communication with the blade outer air seal; and
    a tangible, non-transitory memory configured to communicate with the controller, the tangible, non-transitory memory having instructions stored thereon that, in response to execution by the controller, cause the controller to perform operations comprising:
        receiving, by the controller, an operating objective definition, the operating objection definition comprising at least one of a high-performance mode, a fuel-efficiency mode; a life-cycle cost-minimization mode, or a noise reduction mode, and
        modulating, by the controller, a distance between the blade and the blade outer air seal based on the operating objective definition and an input vector variable, the input vector variable comprising at least one of a fuel price, an aircraft load, a wind speed, an air quality condition, or a maintenance cost.

2. The objective-driven system of claim 1, wherein the operations further comprise modulating, by the controller, an engine climb thrust rating based on the operating objective definition and the input vector variable.

3. The objective-driven system of claim 2, wherein:
    in the high-performance mode the blade is located a first distance from the blade outer air seal during take-off and the engine climb thrust rating is set at a first engine climb thrust rating during take-off;
    in the fuel-efficiency mode the blade is located a second distance from the blade outer air seal during take-off and the engine climb thrust rating is set at a second engine climb thrust rating during take-off, wherein the second distance is less than the first distance, and wherein the second engine climb thrust rating is less than the first engine climb thrust rating; or
    in the life-cycle cost-minimization mode the blade is located a third distance from the blade outer air seal during take-off and the engine climb thrust rating is set at a third engine climb thrust rating during take-off, wherein the third distance is less than the second distance, and wherein the third engine climb thrust rating is less than the second engine climb thrust rating.

4. The objective-driven system of claim 3, wherein
    in the noise reduction mode the blade is located a fourth distance from the blade outer air seal during take-off and the engine climb thrust rating is set at a fourth engine climb thrust rating during take-off, wherein the fourth distance is less than the second distance, and wherein the fourth engine climb thrust rating is less than the second engine climb thrust rating.

5. The objective-driven system of claim 2, wherein the operations further comprise determining, by the controller, a desired distance between the blade and the blade outer air seal and a desired engine climb thrust rating using an optimization loop comprising the operating objective definition, the input vector variables, and an output vector variable, the output vector variable comprising at least one of a fuel consumption target, a partial cycle count, a target exhaust gas temperature, or a de-rated engine climb thrust.

6. The objective-driven system of claim 5, wherein the input vector variable is updated in real-time.

7. The objective-driven system of claim 2, wherein the controller is configured to recognize an override signal output from a cockpit of an aircraft, and wherein upon receiving, by the controller, the override signal, the controller adjusts at least one of the distance between the blade and the blade outer air seal or the engine climb thrust rating based on the override signal.

8. The objective-driven system of claim 2, wherein the operations further comprise modulating, by the controller, an aircraft parameter based on the operating objective definition.

9. The objective-driven system of claim 1, wherein modulating, by the controller, the distance between the blade and the blade outer air seal comprises:
    receiving, by the controller, a position signal from a blade outer air seal position sensor;
    receiving, by the controller, a temperature signal from an exhaust gas temperature sensor; and
    outputting, by the controller, a command signal to an actuator in operable communication with the blade outer air seal.

10. A method of objective-driven blade tip clearance control for a gas turbine engine, comprising:
    inputting, into a controller, an operating objective definition, the operating objective definition comprising at least one of a high-performance mode, a fuel-efficiency mode, a life-cycle cost-minimization mode, or a noise reduction mode;
    determining, by the controller, a desired distance between a blade of the gas turbine engine and a blade outer air seal disposed radially outward of the blade using the operating objective definition and at least one of a fuel price, an aircraft load, a wind speed, an air quality condition, or a maintenance cost;
    determining, by the controller, a desired engine climb thrust rating using the operating objective definition and the at least one of the fuel price, the aircraft load, the wind speed, the air quality condition, or the maintenance cost;
    modulating, by the controller, a distance between the blade and the blade outer air seal based on the desired distance; and
    modulating, by the controller, an engine climb thrust rating based on the engine climb thrust rating.

11. The method of claim 10, further comprising:
determining, by the controller, a desired aircraft parameter using the operating objective definition and the at least one of the fuel price, the aircraft load, the wind speed, the air quality condition, or the maintenance cost; and
modulating, by the controller, an aircraft parameter based on the desired aircraft parameter.

12. The method of claim 10, wherein the operating objective definition is at least one of:
a high-performance mode comprising a first distance between the blade and the blade outer air seal and a first engine climb thrust rating;
a fuel-efficiency mode comprising a second distance between the blade and the blade outer air seal and a second engine climb thrust rating, wherein the second distance is less than the first distance, and wherein the second engine climb thrust rating is less than the first engine climb thrust rating; and
a life-cycle cost-minimization mode comprising a third distance between the blade and the blade outer air seal and a third engine climb thrust rating, wherein the third distance is less than the second distance, and wherein the third engine climb thrust rating is less than the second engine climb thrust rating.

13. The method of claim 12, further comprising configuring the operating objective definition to increase an exhaust gas temperature margin.

14. The method of claim 10, further including configuring the controller to recognize an override of the operating objective definition.

15. The method of claim 10, wherein modulating, by the controller, the distance between the blade and the blade outer air seal based on the desired distance comprises:
receiving, by the controller, a position signal from a blade outer air seal position sensor;
comparing, by the controller, the position signal to the desired distance; and
outputting, by the controller, a command signal to an actuator in operable communication with the blade outer air seal.

16. The method of claim 15, wherein the at least one of the fuel price, the aircraft load, the wind speed, the air quality condition, or the maintenance cost is updated in real-time.

17. An objective-driven system for blade tip clearance control, comprising:
a blade outer air seal;
a controller in operable communication with the blade outer air seal; and
a tangible, non-transitory memory configured to communicate with the controller, the tangible, non-transitory memory having instructions stored thereon that, in response to execution by the controller, cause the controller to perform operations comprising:
receiving, by the controller, an operating objective definition, the operating objection definition comprising at least one of a high-performance mode, a fuel-efficiency mode, a life-cycle cost-minimization mode, or a noise reduction mode, and
modulating, by the controller, a location of the blade outer air seal using the operating objective definition, a plurality of input vector variables, and a plurality of output vector variables driven by the plurality of input vector variables.

18. The objective-driven system of claim 17, wherein modulating, by the controller, the location of the blade outer air seal comprises:
determining, by the controller, a desired distance between the blade outer air seal and a blade radially inward of the blade outer air seal using the optimization loop;
receiving, by the controller, a position signal from a blade outer air seal position sensor;
comparing, by the controller, the position signal to the desired distance; and
outputting, by the controller, a command signal to an actuator in operable communication with the blade outer air seal.

19. The objective-driven system of claim 17, wherein the operations further comprise modulating, by the controller, an engine climb thrust rating using the optimization loop.

20. The objective-driven system of claim 17, wherein the operations further comprise modulating, by the controller, an aircraft parameter using the optimization loop.

* * * * *